US008597102B2

(12) United States Patent

Kitamura et al.

(10) Patent No.: US 8,597,102 B2

(45) Date of Patent: Dec. 3, 2013

(54) GAMING MACHINE AND CONTROL METHOD THEREOF

(75) Inventors: Kenta Kitamura, Koto-ku (JP); Yoichi Kato, Koto-ku (JP); Makoto Miyawaki, Koto-ku (JP); Hiromoto Yamauchi, Koto-ku (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 219 days.

(21) Appl. No.: 13/068,865

(22) Filed: Jun. 20, 2011

(65) Prior Publication Data

US 2012/0322539 A1 Dec. 20, 2012

(51) Int. Cl.

*A63F 9/24* (2006.01)

*A63F 13/00* (2006.01)

(52) U.S. Cl.

USPC .................. 463/18; 463/16; 463/17; 463/20; 463/22; 463/31

(58) Field of Classification Search

USPC .................................................... 463/17

See application file for complete search history.

(56) References Cited

U.S. PATENT DOCUMENTS

| | | | | |
|---|---|---|---|---|
| 6,142,872 | A * | 11/2000 | Walker et al. | 463/16 |
| 6,206,782 | B1 * | 3/2001 | Walker et al. | 463/25 |
| 6,312,332 | B1 * | 11/2001 | Walker et al. | 463/23 |
| 6,361,441 | B1 * | 3/2002 | Walker et al. | 463/42 |
| 6,503,146 | B2 * | 1/2003 | Walker et al. | 463/25 |
| 6,712,699 | B2 * | 3/2004 | Walker et al. | 463/30 |
| 6,733,390 | B2 * | 5/2004 | Walker et al. | 463/23 |
| 7,364,510 | B2 * | 4/2008 | Walker et al. | 463/42 |
| 7,637,811 | B2 * | 12/2009 | Walker et al. | 463/25 |
| 7,695,358 | B2 * | 4/2010 | Walker et al. | 463/13 |
| 8,235,782 | B2 * | 8/2012 | Walker et al. | 463/13 |
| 2002/0042296 | A1 * | 4/2002 | Walker et al. | 463/23 |
| 2002/0111209 | A1 * | 8/2002 | Walker et al. | 463/25 |
| 2002/0151365 | A1 * | 10/2002 | Walker et al. | 463/42 |
| 2002/0173355 | A1 * | 11/2002 | Walker et al. | 463/25 |
| 2004/0204235 | A1 * | 10/2004 | Walker et al. | 463/29 |
| 2004/0242297 | A1 * | 12/2004 | Walker et al. | 463/13 |
| 2004/0242303 | A1 * | 12/2004 | Walker et al. | 463/16 |
| 2006/0240892 | A1 * | 10/2006 | Walker et al. | 463/25 |
| 2006/0247013 | A1 * | 11/2006 | Walker et al. | 463/20 |
| 2006/0247014 | A1 * | 11/2006 | Walker et al. | 463/20 |
| 2007/0010321 | A1 * | 1/2007 | Walker et al. | 463/25 |
| 2007/0010322 | A1 * | 1/2007 | Walker et al. | 463/25 |
| 2007/0015571 | A1 * | 1/2007 | Walker et al. | 463/25 |
| 2007/0087823 | A1 * | 4/2007 | Walker et al. | 463/25 |
| 2007/0093288 | A1 * | 4/2007 | Walker et al. | 463/25 |
| 2008/0268958 | A1 * | 10/2008 | Walker et al. | 463/40 |
| 2010/0167802 | A1 * | 7/2010 | Walker et al. | 463/11 |

* cited by examiner

*Primary Examiner* — Steven J Hylinski

(74) *Attorney, Agent, or Firm* — Lexyoume IP Meister, PLLC.

(57) ABSTRACT

A gaming machine 10 includes: a display device configured to display a plurality of symbols to be continuously arranged; and a controller 30. The controller 30 executes processing operations of: (a1) sequentially executing game processing for a plurality of players and then according to a result of the game processing, determining any of the symbols is to be assigned to a respective one of the players; (a2) paying out a prize according to the symbols that are assigned according to a result of the determination; and (a3) generating a scramble event in which the assigned symbols are scrambled between the plurality of players, in a case where the prize is identical as to the plurality of players.

4 Claims, 18 Drawing Sheets

FIG. 15

A101

A101a

| FIRST GAME TERMINAL | | | | |
|---|---|---|---|---|
| UNIT GAME NUMBER | AREA NUMBER | POSITIONAL INFORMATION | PRIZE | MILITARY COMMANDER CARD |
| ⋮ | ⋮ | ⋮ | ⋮ | ⋮ |
| 3 | ar11 | | | |
| 3 | ar12 | | | |
| 3 | ar13 | | | |
| 3 | ar14 | | | |
| ⋮ | ⋮ | | | |

A101b

| SECOND GAME TERMINAL | | | | |
|---|---|---|---|---|
| UNIT GAME NUMBER | AREA NUMBER | POSITIONAL INFORMATION | PRIZE | MILITARY COMMANDER CARD |
| ⋮ | ⋮ | ⋮ | ⋮ | ⋮ |

GAMING MACHINE AND CONTROL METHOD THEREOF

BACKGROUND OF THE INVENTION

1. Field of the Invention

The present invention relates to a gaming machine and a control method of the gaming machine that executes a scramble game between game terminals.

2. Description of the Related Art

Conventionally, in gaming machines, it has been general that a win or loss in a game is determined between a gaming facility side (a gaming machine side), on which the gaming machines have been installed, and players, and a prize is awarded to a winning player according to the win or loss. Such gaming machines are disclosed in United State Patent Application Publication No. 2008/0058067 and United State Patent Application Publication No. 2008/0058072.

In the meantime, it is considered that a gaming machine with its higher interest can be provided if there can be imparted a new gaming property of scrambling prizes between players, in addition to the presence or absence of prizes between gaming machines (a gaming facility) and players.

Therefore, it is an object of the present invention to provide a gaming machine that is capable of imparting a new gaming property of scrambling prizes between players.

SUMMARY OF THE INVENTION

A gaming machine according to embodiment of the present invention comprising:

a display device configured to display a plurality of symbols to be continuously arranged; and a controller programmed to execute processing operations of:

(a1) sequentially executing game processing for a plurality of players and then according to a result of the game processing, determining any of the symbols is to be assigned to a respective one of the players;

(a2) paying out a prize according to the symbols that are assigned according to a result of the determination; and (a3) generating a scramble event in which the assigned symbols are scrambled between the plurality of players, in a case where the prize is identical as to the plurality of players.

According to the configuration described above, in a case where the same amount of prize is awarded in game processing as to a plurality of players, a scramble event occurs, whereby the players cannot identify when the scramble event occurs, and a gaming machine with its high entertainment can be provided accordingly.

The gaming machine according to embodiment of the present invention, in the configuration described above, comprising a first display device and a second display device that is disposed upward of the first display device, wherein the controller is configured to:

in the processing operation (a1), movably display a dice image that is displayed on the first display device, so as to roll to the second display device, and then, determine a number that is assigned to any face of the dice, as a result of the game processing; and determine a symbol to be assigned to the players in accordance with the determined number of the dice.

According to the configuration described above, a player's interest in game can be enhanced by rendering of dice image rolling.

The gaming machine according to embodiment of the present invention, in the configuration described above, in the processing operation (a3), the controller is configured to determine a result of the scramble event, based on an input element, in a case where each player inputs the element according to any of the symbols that are assigned by the game processing executed in a past.

According to the configuration described above, a player inputs an element according to the symbols acquired in past game processing in a scramble event, whereby a result of the scramble event is influenced, and entertainment of the game can be remarkably improved.

A control method of a gaming machine according to the aspect of present invention, that has a display device configured to display a plurality of symbols to be continuously arranged, said control method comprising the steps of:

(a1) sequentially executing game processing for a plurality of players and then according to a result of the game processing, determining any of the symbols is to be assigned to a respective one of the players;

(a2) paying out a prize according to the symbols that are assigned according to a result of the determination; and (a3) generating a scramble event in which the assigned symbols are scrambled between the plurality of players, in a case where the prize is identical as to the plurality of players.

According to the control method described above, in a case where the same amount of prize is awarded in game processing as to a plurality of players, a scramble event occurs, whereby the players cannot identify when the scramble event occurs, and a gaming machine with its high entertainment can be provided.

BRIEF DESCRIPTION OF THE DRAWINGS

FIG. 15 is a view showing a unit game result storage region in a RAM;

DESCRIPTION OF THE PREFERRED EMBODIMENTS (Outline of Gaming Machine)

Figure 1:
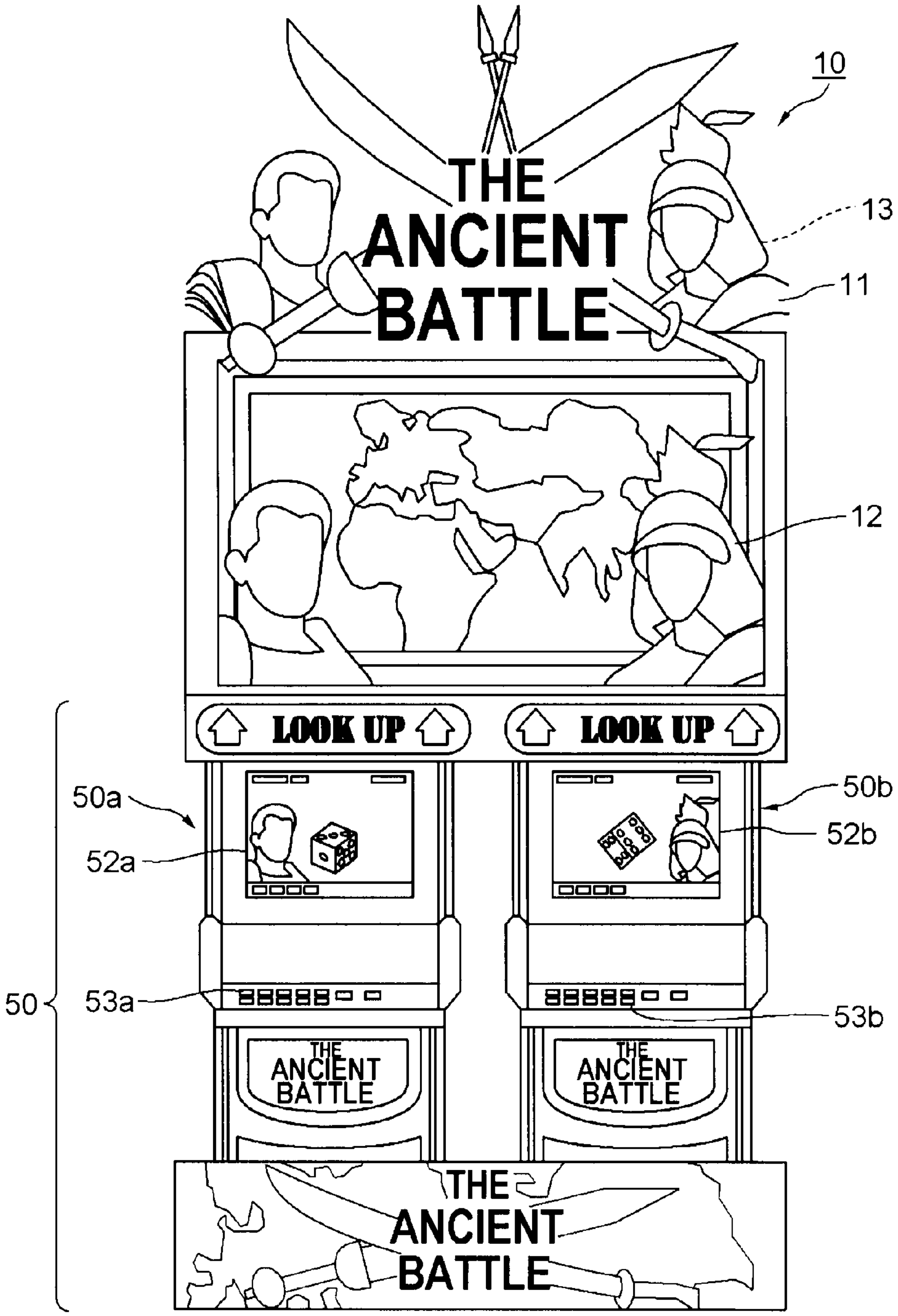
FIG. 1 is a view showing an appearance of a gaming machine.

Hereinafter, an illustrative embodiment of the present invention will be described with reference to the drawings. As shown in FIG. 1, a gaming machine 10 according to the illustrative embodiment has two game terminals 50*a* and 50*b* that are adjacent to each other and one common display device 12. A decoration plate 11 comprised of an optically transmissible panel is provided at an upper part of a common display device 12, and an LED 13 is disposed at a rear of this plate. The LED 13 is lit, whereby rendering is performed as if the decoration plate 11 were emitting light.

A normal game to be executed in a gaming machine 10 is a game in which two players sequentially acquire a part (an area) in a map displayed on the common display device 12 by means of operation of game terminals 50*a* and 50*b*. While the illustrative embodiment describes a game to be played by acquiring an area that is a part of a map, the game is not always limited to such an "area", and may be a game in which, from among so called symbols that are continuously arranged, a plurality of players sequentially select (acquire) the symbols. That is, the "area" is included as one example of symbols, and the symbols are not limited to the "area".

One player operates the game terminal 50*a*, whereby an appearance of dice rolling is displayed on the terminal display device 52*a* of the game terminal 50*a*, and an area to be acquired is determined by rolled numbers of the dice that have stopped. Similarly, the other player operates the game terminal 50*b*, whereby an appearance of dice rolling is displayed on the terminal display device 52*b* of the game terminal 50*b*, and an area to be acquired is determined by the rolled numbers of the dice that have stopped. This normal game is a game in which two players operate the game terminals 50*a* and 50*b* alternately, whereby their own areas are gradually increased, and a player who has finally acquired a larger area becomes a winner.

When each of the players has acquired an area, a prize according to the acquired area is awarded every time. In addition, to the acquired area, its own event or prize is assigned so that the players can expect the prize according to the acquired area or the progress of the game. In addition, in each of the areas, one military commander (hereinafter, referred to as a military commander card) is assigned as an element associated with each of the areas, and a player who has acquired that area can acquire the military commander card together with the area. Further, in the case of the illustrative embodiment, apart from the event associated with each of the areas, in a case where two players have acquired the same amount of prize (in a case where the amounts of prizes assigned to the acquired areas are identical to each other), a scramble event occurs. For example, in a case where one player has acquired an area, it is assumed that a prize of 50 credits has been assigned in advance to the area. Next, the other player acquires any area in accordance with the rolled numbers of dices, and in a case where the prize associated with this area is the same in amount as the prize (50 credits) that one player has acquired, the normal game in progress is suspended, and a scramble event occurs in the gaming machine 10.

A scramble event is an event in which players scramble a prize which has caused a trigger for an occurrence of the scramble event and each of the players scrambles a part of the acquired area. If this scramble event occurs, the respective terminal display devices 52*a* and 52*b* of the game terminals 50*a* and 50*b* provide a display prompting the players to select either one of the military commanders assigned to the players in accordance with area acquisition and a display prompting the players to additional entry of credit. If each of the players selects any one from among one's own military commanders and additionally inputs a desired amount of credit to the game terminals 50*a* and 50*b*, the common display device 12 displays an image of a battle that is caused by a scramble event, and a win or loss of the players is determined.

The win or loss of the player in the scramble event is determined in accordance with the selected military commander card and the input number of credits. That is, there are a plurality of types of the military commander cards that are assigned to the respective areas and awarded to players, and the number of points is predetermined to a respective one of the military commander cards that each of the players selects in the scramble event. A superiority or inferiority correlation between the military commander cards is determined depending on the number of points that has been predetermined above. A military commander card with more points becomes a winner. In addition, the number of credits that a player has additionally input in the scramble event has an effect on a win or loss. For example, even in a case where a military commander card that one player has selected is stronger by 10 points than the one that the other player has selected, if the number of credits that the other player has additionally input is the number of credits that is sufficient to overcome this superiority or inferiority correlation, the other player becomes a winner. Such a superiority or inferiority correlation is computed in a control portion 30 of the gaming machine 10.

A player who has won in the scramble event takes from the other player an area of the military commander that the other player has selected in the scramble event. That is, in addition to the normal game, in the scramble event as well, a winner can increase an area. In addition, the player who has won in the scramble event can take the prize relating to the scramble event from the other player. The word "taking a prize" denotes changing a right of receiving a prize.

When all of the areas that are displayed on the common display device 12 have been acquired while such a scramble event is performed, the normal game in the gaming machine 10 completes. A player who has acquired a larger area at the time point of the completion becomes a winner of the normal game, and a predetermined prize in the normal game can be obtained.

Figure 2:
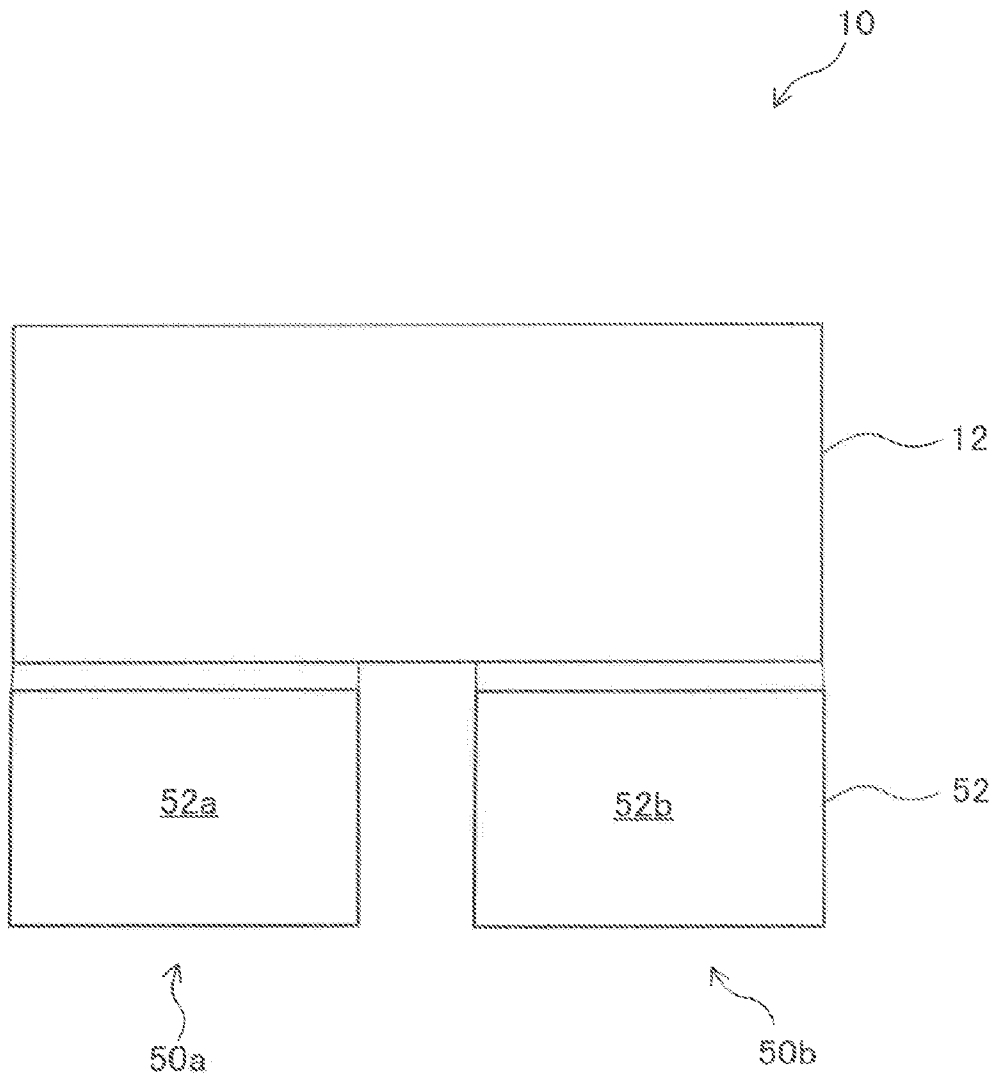
FIG. 2 is a view showing a layout example of a display device in the gaming machine.

FIG. 2 is a schematic wiring diagram showing a layout of the common display device 12, the game terminals 50*a* and 50*b*, and terminal display devices 52*a* and 52*b*. The terminal display devices 52*a* and 52*b* of the game terminals 50*a* and 50*b* are disposed adjacent to each other, and the common display device 12 is disposed at an upper part of these display devices.

Figure 3:
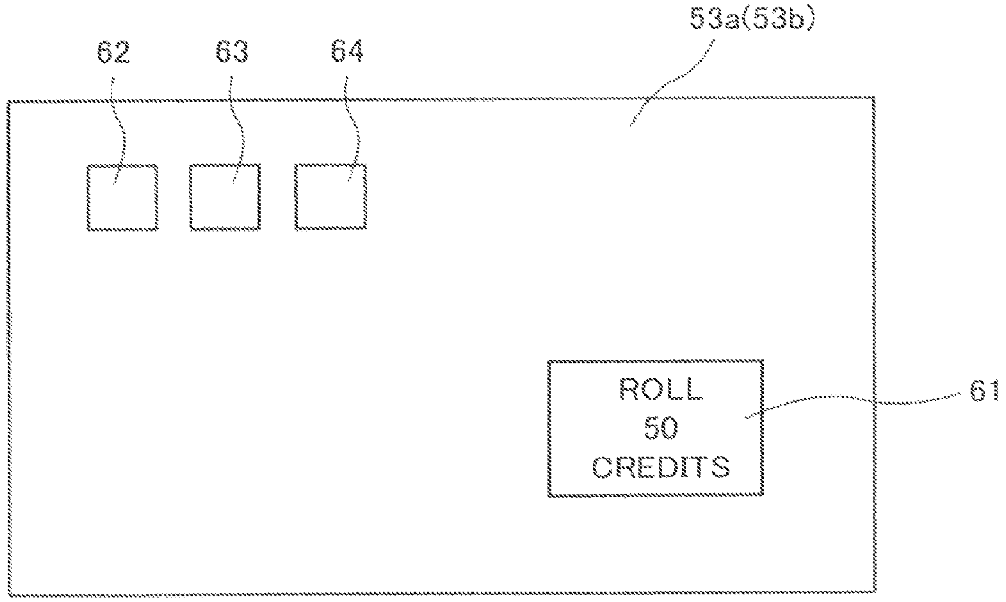
FIG. 3 is a view showing an operating portion in the gaming machine.

FIG. 3 is a schematic wiring diagram showing operating portions 53*a* and 53*b* that are respectively provided in the game terminals 50*a* and 50*b*. The game terminals 50*a* and 50*b* respectively have the operating portions 53*a* and 53*b* that have their similar configurations.

A change button (a CHANGE button) 64, a cashout button (a CA SHOUT button) 63, and a help button (a HELP button) 62 are provided in the operating portions 53*a* and 53*b*, and a "ROLL 50 CREDITS" button (a ROLL button) 61 is provided. A player operates the "ROLL 50 CREDITS" button 61 to thereby enter a predetermined number of credits (for example, 50 credits) from the player's credits, and then, a normal game can be advanced.

Figure 4:
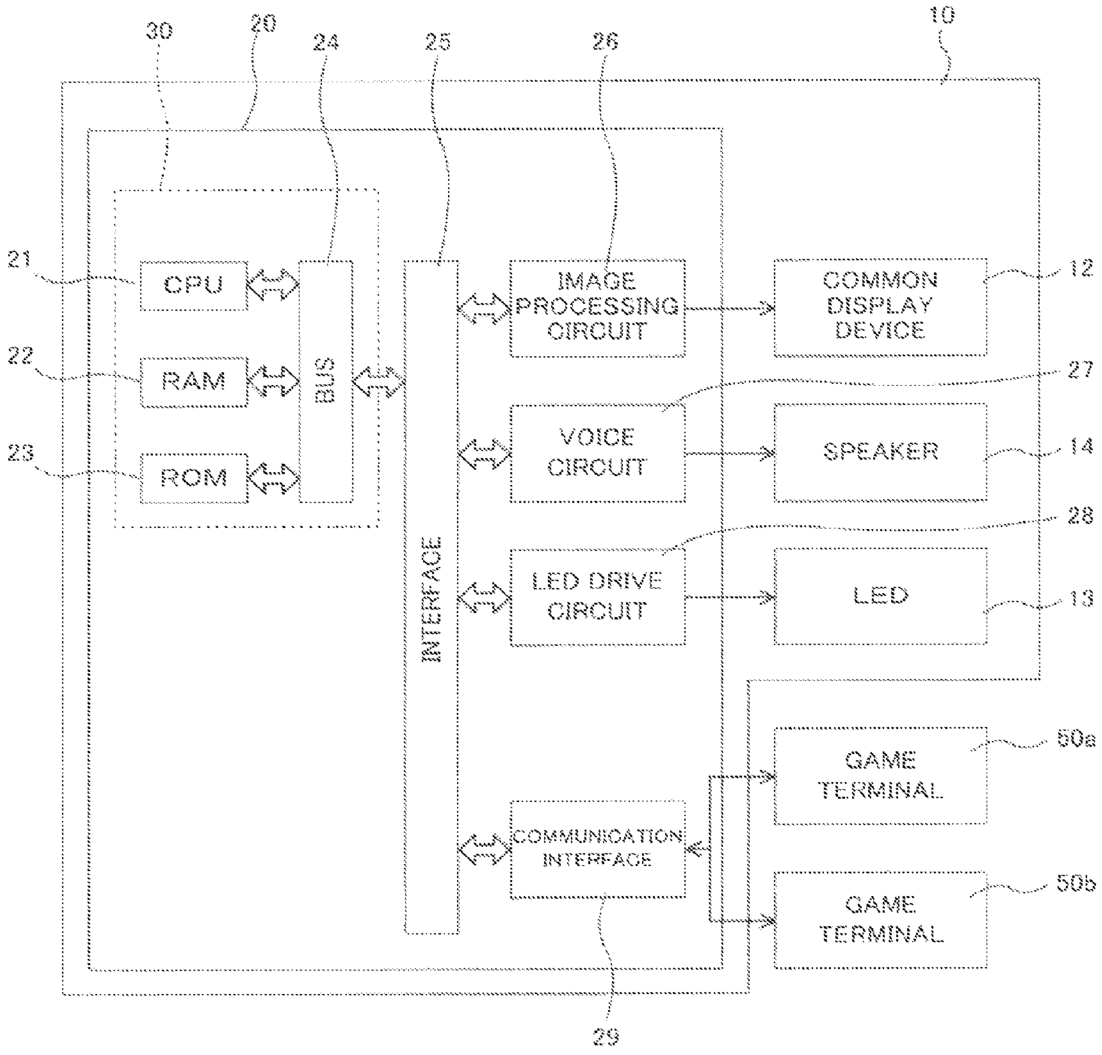
FIG. 4 is a view showing an internal configuration of the gaming machine.

FIG. 4 is a block diagram depicting a configuration of the gaming machine 10. As shown in FIG. 4, the gaming machine 10 includes: a control portion 30 having a CPU 21, a RAM 22, and a ROM 23, and a bus 24 for connecting them; an image processing circuit 26 for image-processing a signal that is output from the control portion 30 via an interface 25; a common display device 12 for displaying an image by means of the signal image-processed in the image processing circuit 26; a voice circuit 27 for converting the signal that is output from the control portion 30 via the interface 25 to a voice signal; a speaker 14 for outputting a voice by means of the voice signal that is output from the voice circuit 27; an LED drive circuit 28 for generating a signal for driving an LED 13, based on the signal that is output from the control portion 30 via the interface 25; the LED 13 for emitting light by means of a LED drive signal that is output from the LED drive circuit 28; and a communication interface 29 for outputting the signal that is output from the control portion 30 via the interface 25, to the game terminals 50*a* and 50*b*.

A control device 20 is comprised of: the control portion 30; the interface 25; the image processing circuit 26; the voice circuit 27; the LED drive circuit 28, and the communication interface 29.

Figure 5:
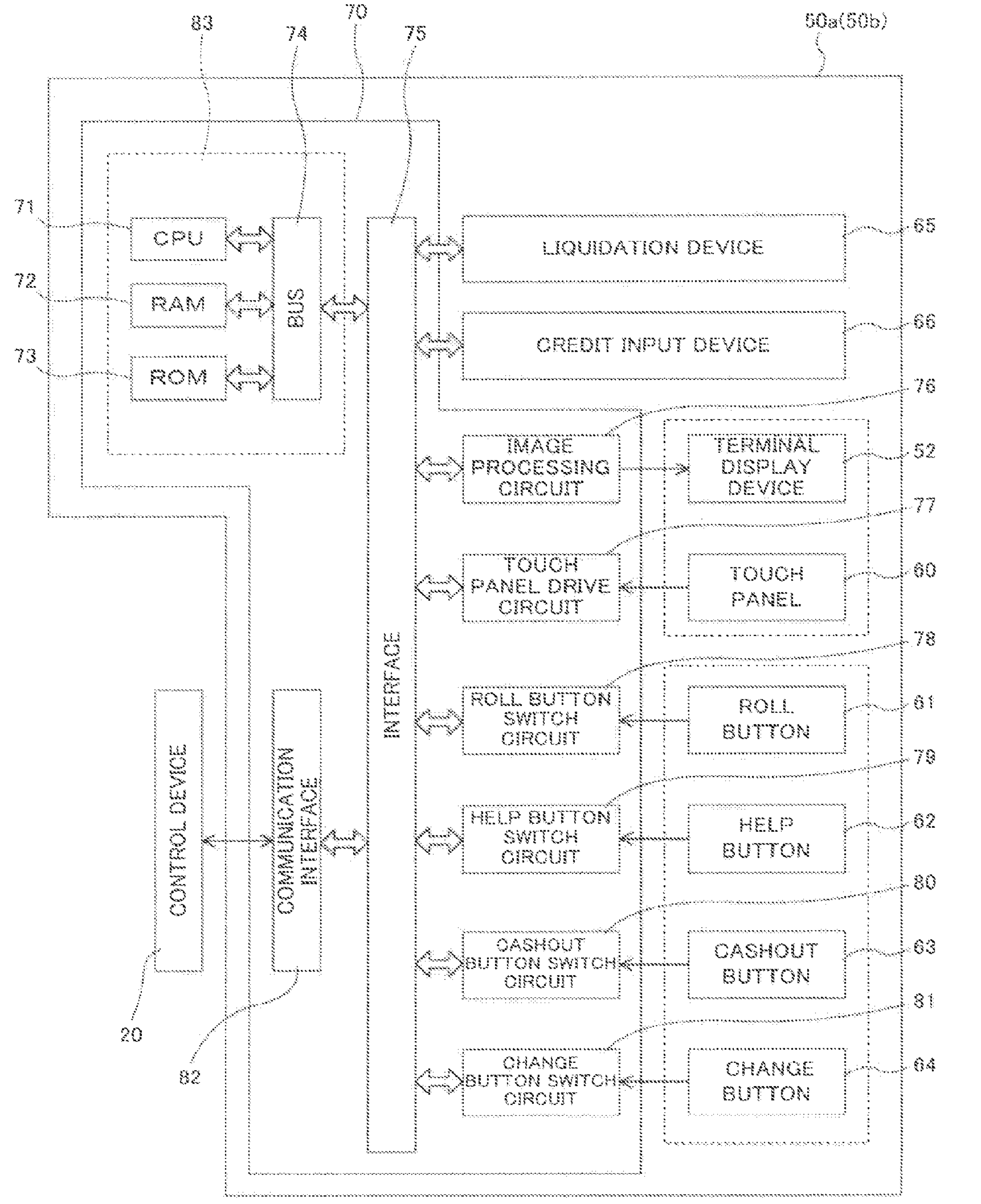
FIG. 5 is a view showing an internal configuration of a game terminal.

FIG. 5 is a block diagram depicting a configuration of the game terminals 50*a* and 50*b*. While only the game terminal 50*a* will be described herein, it is assumed that the game terminal 50*b* also has a similar configuration. As shown in FIG. 4, the game terminal 50*a* includes: a control portion 83 having a CPU 71, a RAM 72, a ROM 73, and a bus 74 for connecting them; a liquidation device 65 for carrying out liquidation processing, based on a signal that is output from the control portion 83 via an interface 75; a credit input device 66 for carrying out input processing of a credit, based on the signal that is output from the control portion 83 via the interface 75; an image processing circuit 76 for image-processing the signal that is output from the control portion 83 via the interface 75; a terminal display device 52 (52*a*) for displaying an image by means of the signal that is image-processed in the image processing circuit 76; a touch panel 60 for accepting a pressing operation from a player; a touch panel drive circuit 77 for driving the touch panel 60 and outputting an operation result that is output from the touch panel 60 to the control portion 83 via the interface 75; a ROLL button 61 for displaying dice images on the terminal display device 52 and the common display device 12 (FIG. 4) and inputting a command for changing images of the dice so as to roll; a ROLL button switch circuit 78 for receiving an operation result of the ROLL button 66 and then outputting the received operation result to the control portion 83 via the interface 75; a HELP button 62 for accepting an input operation from a player and then instructing the control portion 83 to carry out a predetermined emergency operation; a HELP button switch circuit 79 for receiving an operation result of the HELP button 62 and then outputting the received operation result to the control portion 83 via the interface 75; a CASHOUT button 63 for accepting an input operation from a player and then instructing the control portion 83 to carry out cashout processing; a CASHOUT button switch circuit 80 for receiving an operation result of the CASHOUT button 63 and then outputting the received operation result to the control portion 83 via the interface 75; a CHANGE button 64 for accepting an input operation from a player and then instructing the control portion 83 to carry out change processing; and a CHANGE button switch circuit 81 for receiving an operation result from the CHANGE button 64 and then outputting the received operation result to the control portion 83 via the interface 75.

A control device 70 is comprised of: the control portion 83; the interface 75; the image processing circuit 76; the touch panel drive circuit 77; the ROLL button switch circuit 78; the HELP button switch circuit 79; the CASHOUT button switch circuit 80; the CHANGE button switch circuit 81; and a communication interface 82.

The communication interface 82 is intended to make communication with the control device 20 (the communication interface 29) of the gaming machine 10.

In the case of the illustrative embodiment, a variety of game programs such as normal game and scramble event associated therewith is executed by means of a CPU 21 of the control portion 30 of the gaming machine 10. The game programs are stored in a ROM 23 of the gaming machine 10. A CPU 71 of each of the game terminals 50*a* and 50*b* displays images on the terminal display devices 52*a* and 52*b* or pays out a prize, based on a command from the CPU 21 while making communication with the CPU 21 of the gaming machine 10.

Figure 6:
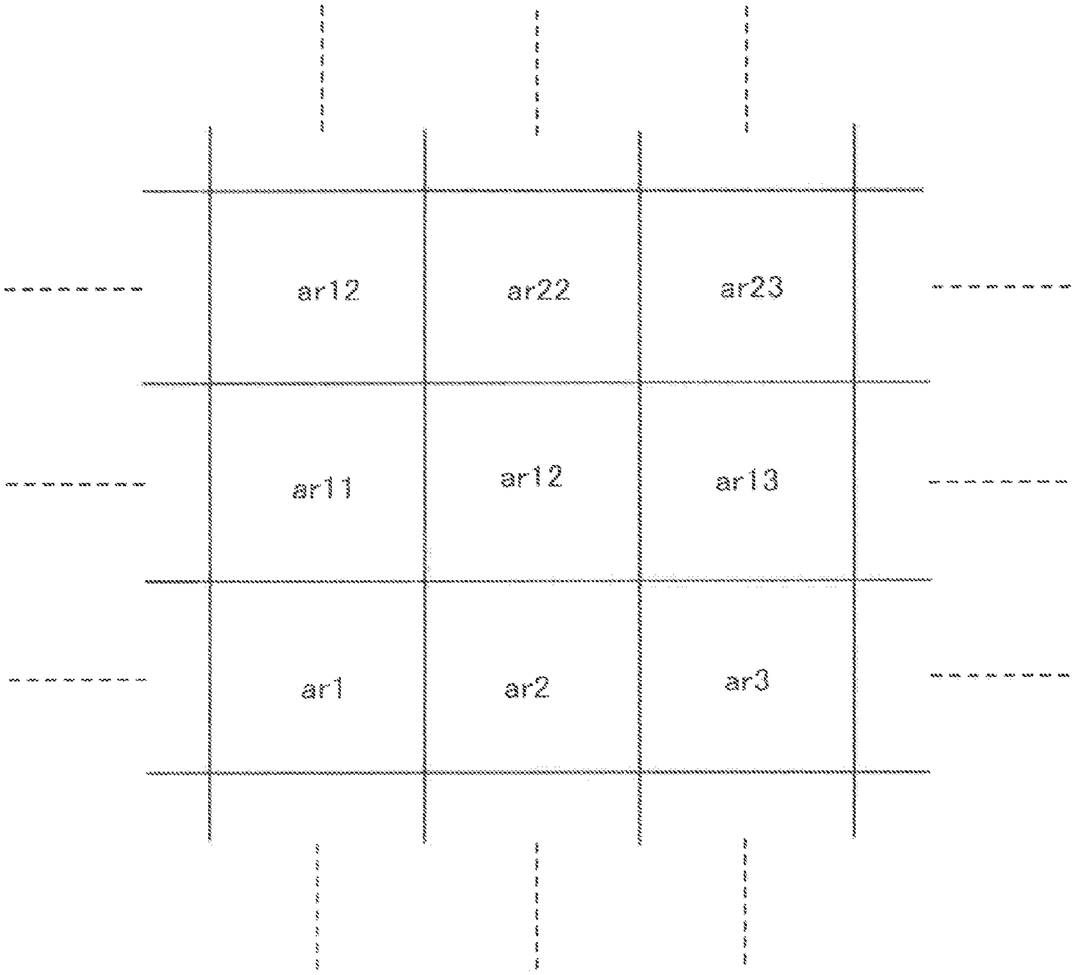
FIG. 6 is a view showing a travelling route (symbol arrays) that is displayed on a common display device.

FIG. 6 is a view showing a part of a map that is displayed on the common display device 12. As shown in FIG. 6, the map is divided into a plurality of areas (ar1, ar2, . . . ). In a normal game, the "ROLL 50 CREDITS" button (ROLL button) 61 (FIG. 3) of the game terminal 50*a* is operated, whereby an area that one player acquires is selected. In addition, the "ROLL 50 CREDITS" button (ROLL button) 61 (FIG. 3) of the game terminal 50*b* is operated, whereby area that the other player acquires is selected. Specifically, the "ROLL 50 CREDITS" button (ROLL button) 61 (FIG. 3) of the game terminal 50*a* is operated, whereby an image of dice rolling is displayed on the terminal display device 52*a* of the game terminal 50*a* and then areas whose number according to the rolled numbers of the dice that has stopped are selected. In this case, the areas that are adjacent to an area having selected in advance are sequentially selected. In addition, the "ROLL 50 CREDITS" button (ROLL button) 61 (FIG. 3) of the game terminal 50*b* is operated, whereby an image of dice rolling is displayed on the terminal display device 52*b* of the game terminal 50*b* and then areas whose number according to the rolled numbers of the dice that has stopped are selected. In this case, the areas that are adjacent to an area having selected in advance are sequentially selected.

Specifically, the rolled numbers of dice are "2", two areas that are adjacent to the area having already been selected (the areas whose number according to the rolled numbers of dice) are randomly selected by means of control of the CPU 21. In a layout example of the areas shown in FIG. 6, for example, assuming that area ar2 has been acquired up to now, any two of the areas ar1, ar12, and ar3 that are adjacent to the area ar2 are randomly selected by means of a lottery employing random numbers.

Figure 7:
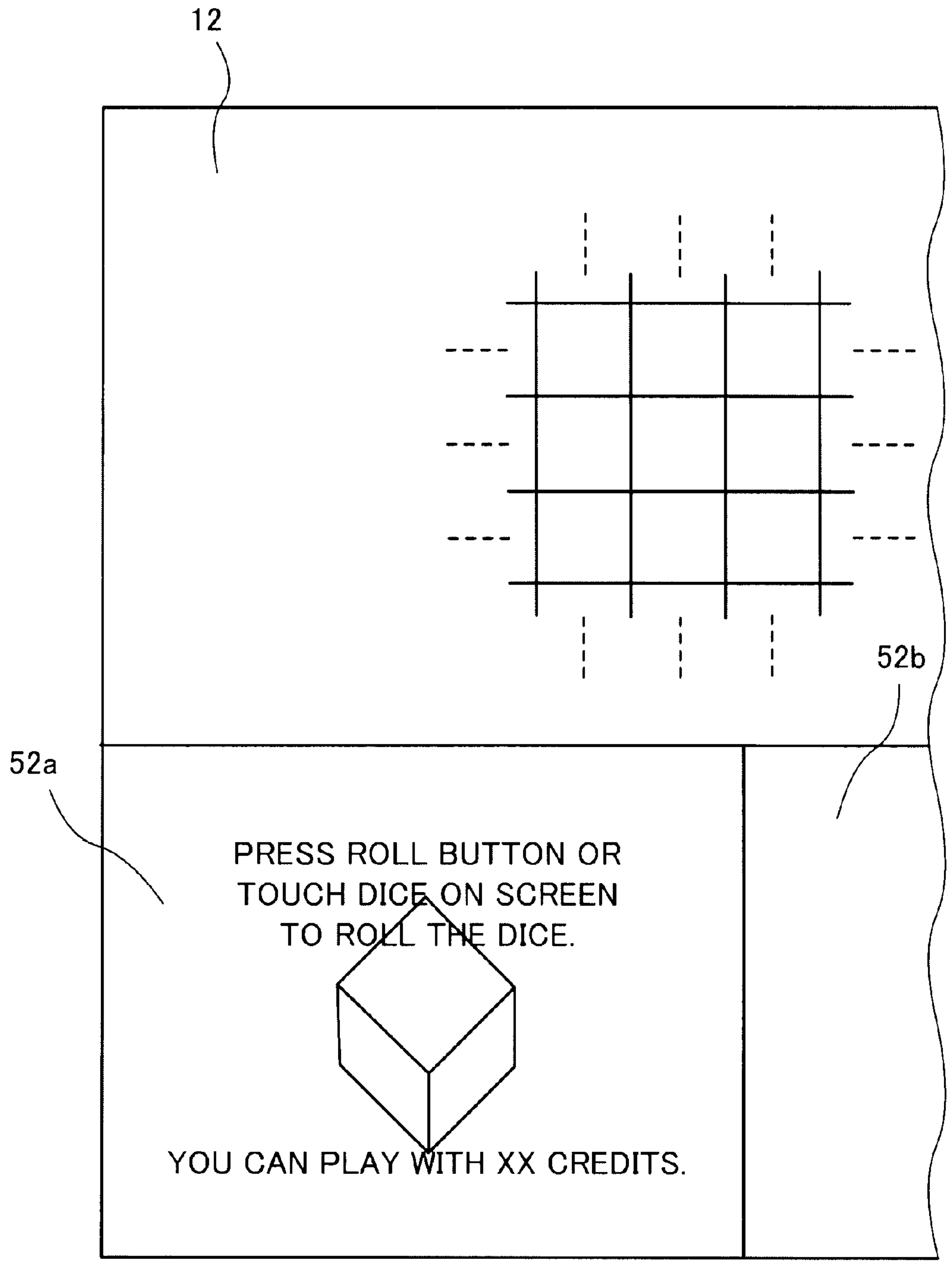
FIG. 7 is a view showing a display state of the common display device and a terminal display device.
Figure 8:
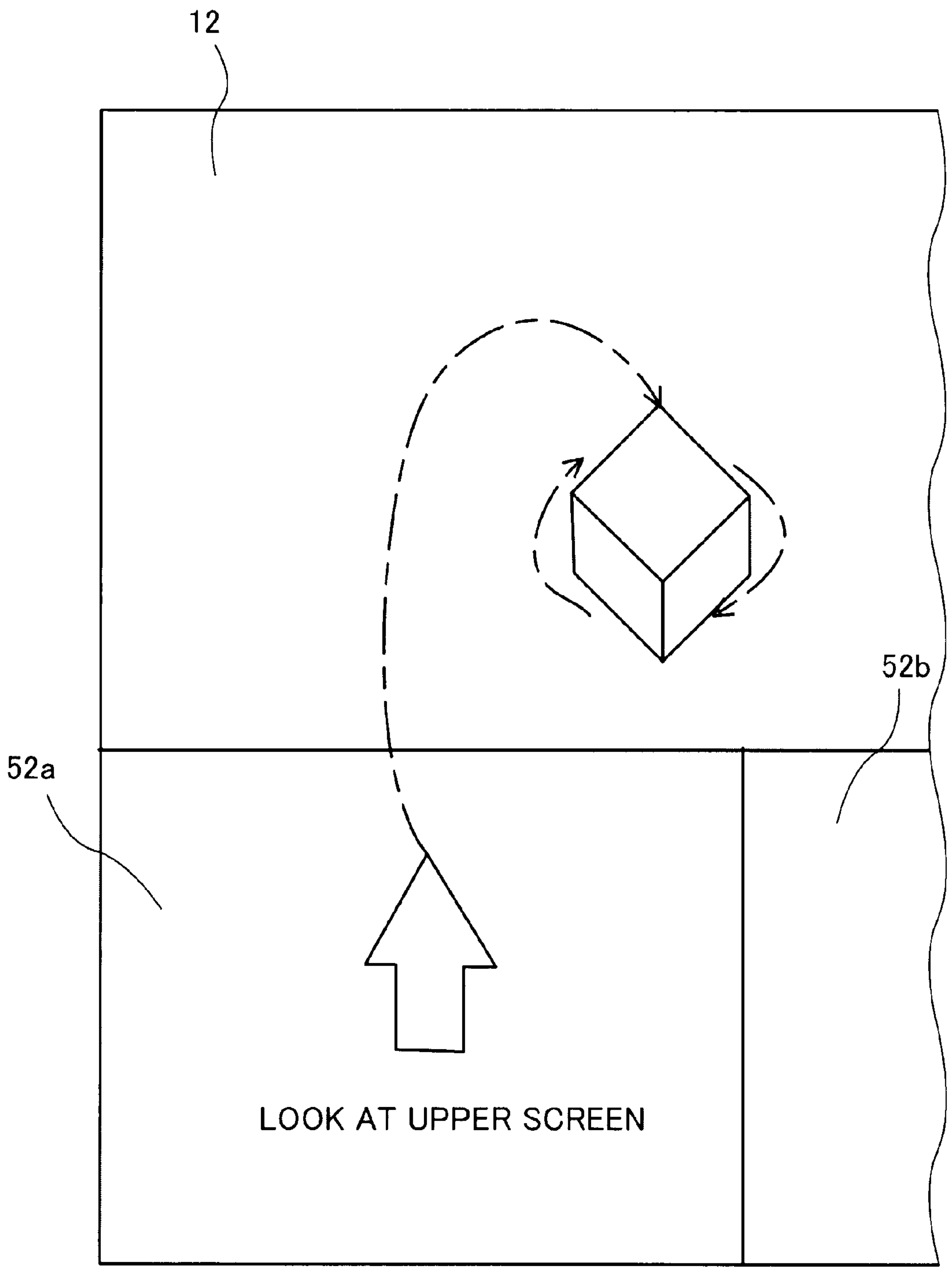
FIG. 8 is a view showing a display state of the common display device and the terminal display device.
Figure 9:
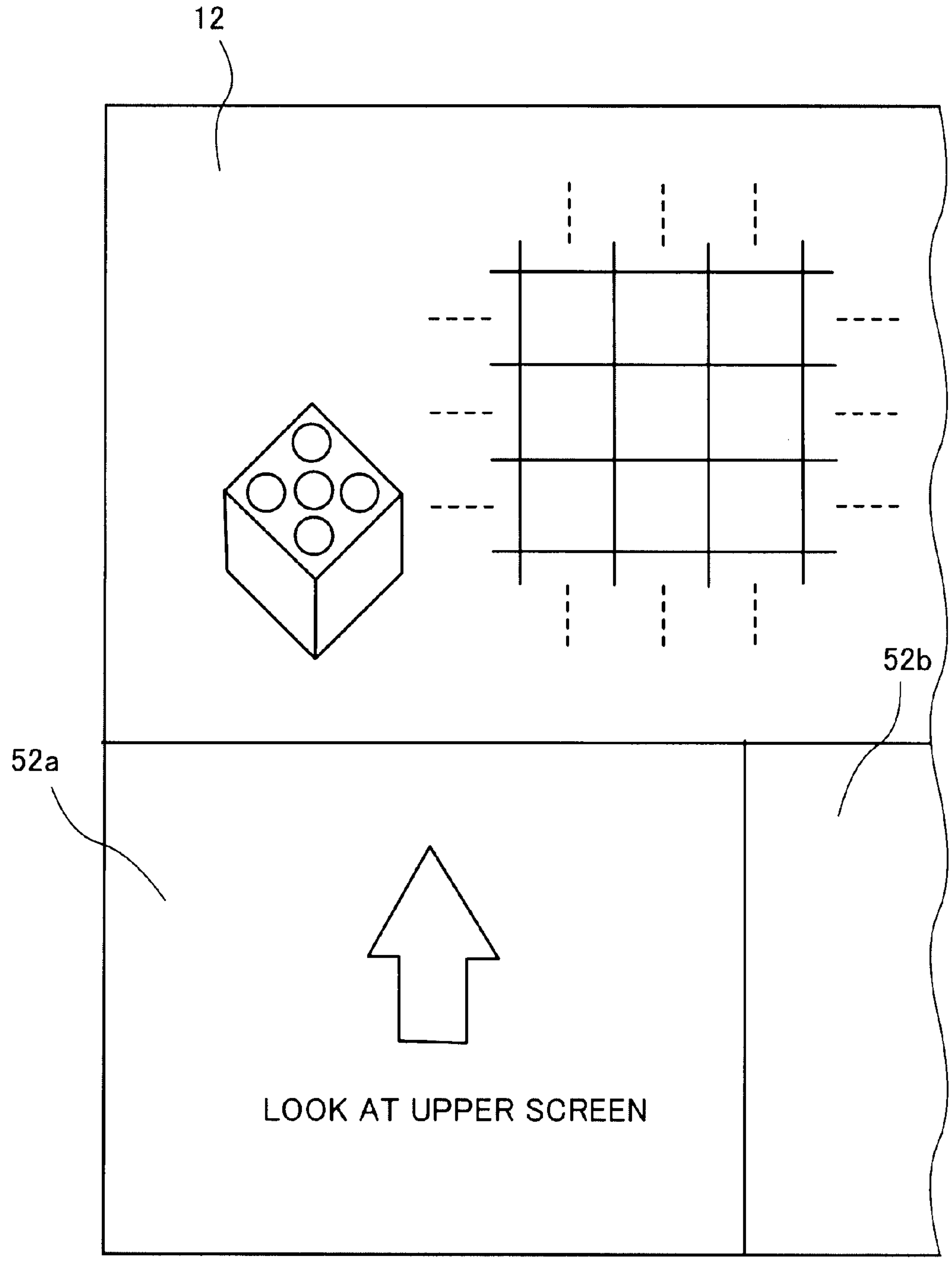
FIG. 9 is a view showing a display state of the common display device and the terminal display device.

FIG. 7 to FIG. 9 are schematic wiring diagrams showing display images of the terminal display devices 52*a* (52*b*) and the common display device 12 in a case where a normal game adapted for area acquisition is played. While the following description will is given with respect to a game terminal 50*a* of the two game terminals 50*a* and 50*b*, it is assumed that similar image display or processing is executed in the game terminal 50*b*.

As shown in FIG. 7, the terminal display device 52*a* of the game terminal 50*a* displays a message "PRESS ROLL BUTTON OR TOUCH DICE ON SCREEN TO ROLL THE DICE. YOU CAN PLAY WITH XX CREDITS". In this case, the common display device 12 displays a map corresponding to each of the game terminals 50*a* and 50*b*.

When a player makes pressing operation of the "ROLL 50 CREDITS" button (ROLL button) 61 (FIG. 3) at the operating portion 53*a* (FIG. 3) or touches a dice image on the terminal display device 52*a*, a CPU 71 of the game terminal 50*a* subtracts the predetermined credits required to play a game from the number of credits that is input from a credit input device 66 (FIG. 5) of the game terminal 50*a*, based on an operation result of the ROLL button 61 or an operation result of the touch panel 60. In a case where subtraction has been possible, the fact designates that the number of credits that is capable of executing a game in the game terminal 50*a* has been input, and the CPU 71 enables the progress of the game and as shown in FIG. 8, a motion image is displayed as if dice were rolling from the terminal display device 52*a* to the common display device 12. Then, as shown in FIG. 9, the CPU 71 causes the common display device 12 to subsequently display an image indicating that any one rolled number of dice stops. The rolled numbers of the dice that stop are determined by means of a random number lottery.

Then, areas whose number according to the rolled numbers of the dice that have stopped. Specifically, the CPU 21 of the gaming machine 10 executes normal game processing in accordance with the programs that are stored in the ROM 23, thereby sequentially randomly selecting areas whose number according to the rolled numbers of the dice from areas that are adjacent to an area having been selected in advance. For example, as shown in FIG. 6, in a case where the area ar1 has already been acquired, if the rolled number of the dice is"3", a first area (area ar2 or ar11) is first selected from among the areas that are adjacent to the area ar1; a second area is further selected from among the areas that are adjacent to the area having already been acquired (selected), including the thus selected area; and a third area is further selected from among the areas that are adjacent to the area having already acquired (selected), including the thus selected area. In this way, as new areas of a player, the areas that have been randomly selected from among the areas that are adjacent to the area already selected are awarded to the player.

Immediately after a normal game has been started, since a selected (acquired) area does not exist yet, starting areas (a starting area for the game terminal 50*a* and a starting area for the game terminal 50*b*) are preset in the ROM 23, and areas that are adjacent to each of the starting areas are sequentially selected.

Next, game control processing to be executed in the gaming machine 10 will be described.

Figure 10:
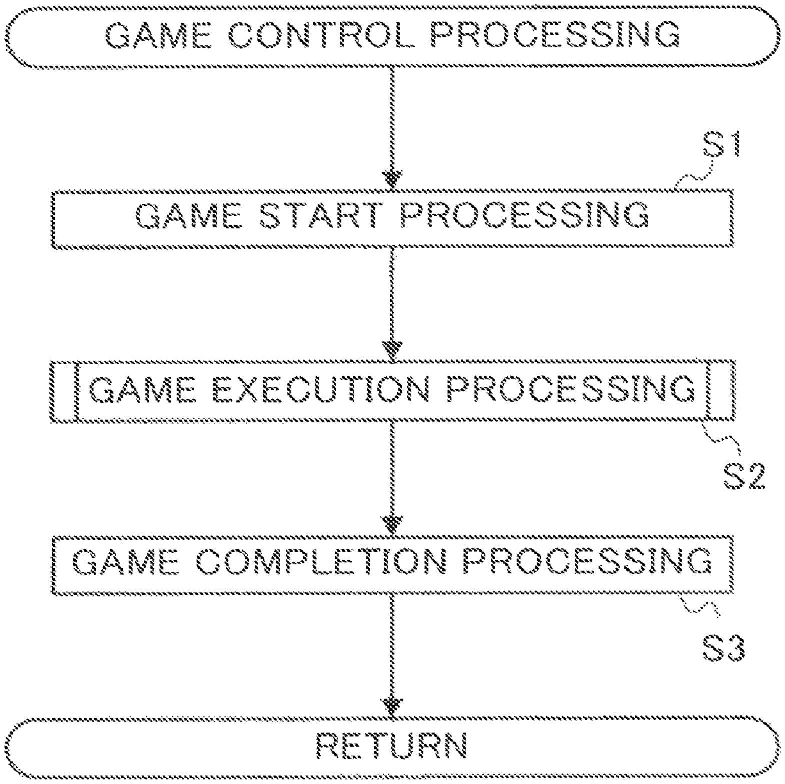
FIG. 10 is a view showing a flowchart of game control processing.

FIG. 10 is a flowchart showing game control processing procedures to be executed by means of the CPU 21 of the gaming machine 10. This processing is directed to processing to be realized by the CPU 21 executing a program that is stored in the ROM 23 of the gaming machine 10.

First, the CPU 21 executes game start processing (step S1). In this processing, the CPU 21 starts a game on a condition that a credit is input in a case where an operation of the touch panel 60 or operating portions 53*a* and 53*b* has been input from either one of the game terminals 50*a* and 50*b*.

When the game is started, the CPU 21 executes game execution processing (step S2). This processing will be described later in FIG. 11. After the game execution processing (step S2) has completed, the CPU 21 executes game completion processing (step S3). In this processing, for example, in a case where a game completes and then a win or loss has been determined, the CPU 21 awards the prize in the game to the game terminal 50*a* or 50*b* and then completes the game.

Figure 11:
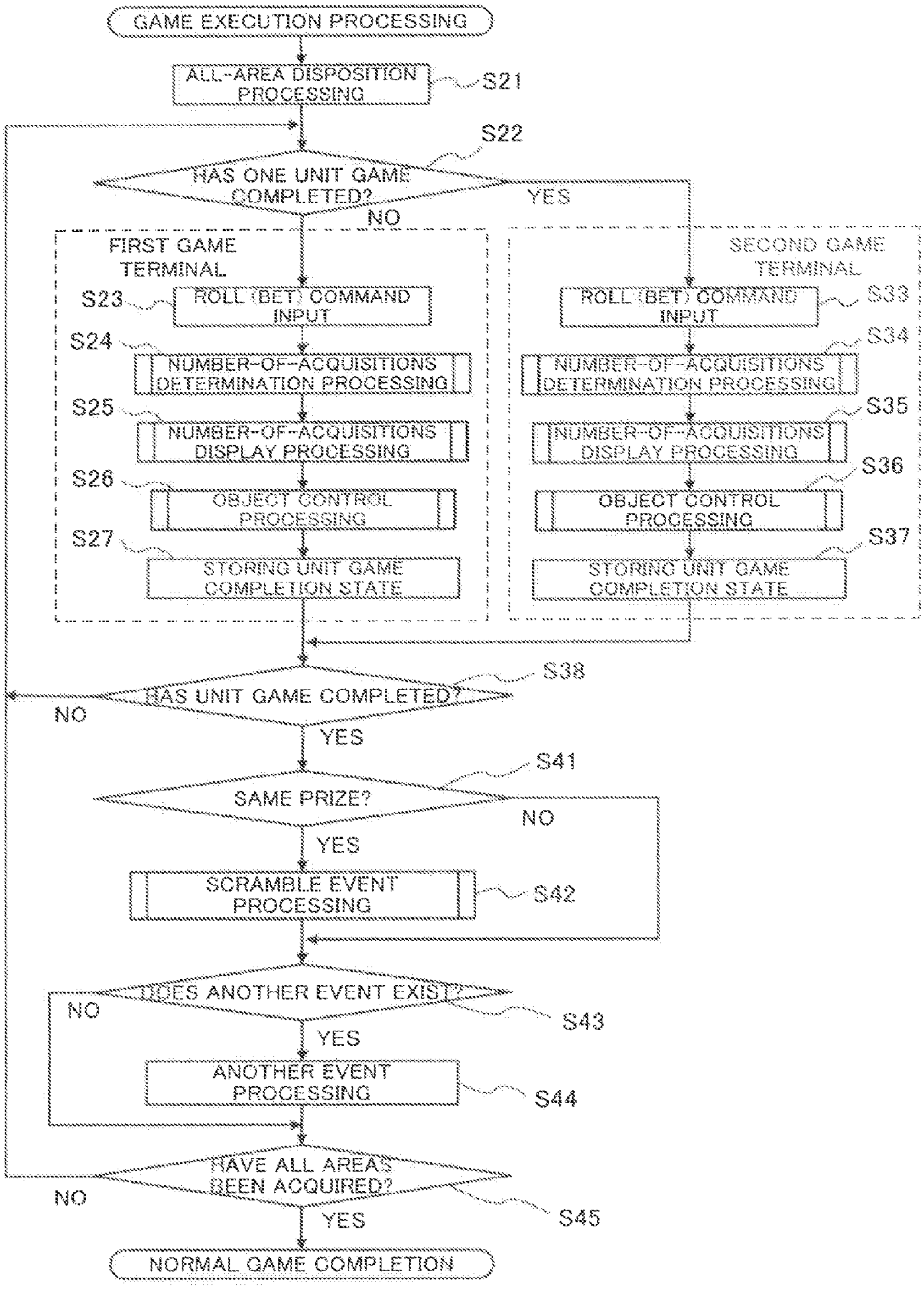
FIG. 11 is a view showing a flowchart of game execution processing.

FIG. 11 is a flowchart showing the game execution processing (step S2) in detail. In FIG. 11, the CPU 21 executes all-area disposition processing (step S21). In this processing, the CPU 21 assigns a plurality of areas that are stored in advance in the ROM 23, to a two-dimensional planar coordinate system. In this manner, a size, a position or the like of each area is represented as a coordinate on a map. These items of mapping information are stored in the RAM 22.

After all-area disposition processing (step S21) has completed, the CPU 21 first determines whether or not unit game processing in a normal game for acquiring an area (one game processing for acquiring an area according to the rolled numbers of dice) has completed as to one game terminal 50*a* (step S22). In the case of the illustrative embodiment, one game terminal 50*a* and the other game terminal 50*b* are adapted to execute a unit game alternately. Every time a unit game completes, the CPU 21 updates information representing a completion state, stored in the RAM 22 (the information in game terminals 50*a* and 50*b* that is overwritten every time the game terminals 50*a* and 50*b* completes a unit game), thereby making it possible to check which current state is indicated from among a state in which a unit game in one game terminal 50*a* has completed and a state in which a unit game in the other game terminal 50*b* has completed.

In a case where the unit game of one game terminal 50*a* has not completed (step S22: NO), the CPU 21 displays prompting a player to make an operation as shown in FIG. 7 as to the game terminal 50*a* and waits for ROLL (BET) command input (step S23). In this processing, the CPU 21 provides a display prompting a player to input a ROLL (BET) command to the terminal display device 52*a* of the game terminal 50*a*. In accordance with this display, if one player operates a touch panel of the game terminal 50*a* or the ROLL button 61 of an operating portion 53*a*, the CPU 21 executes number-of-acquisitions determination processing (step S24) as to the game terminal 50*a*.

Figure 12:
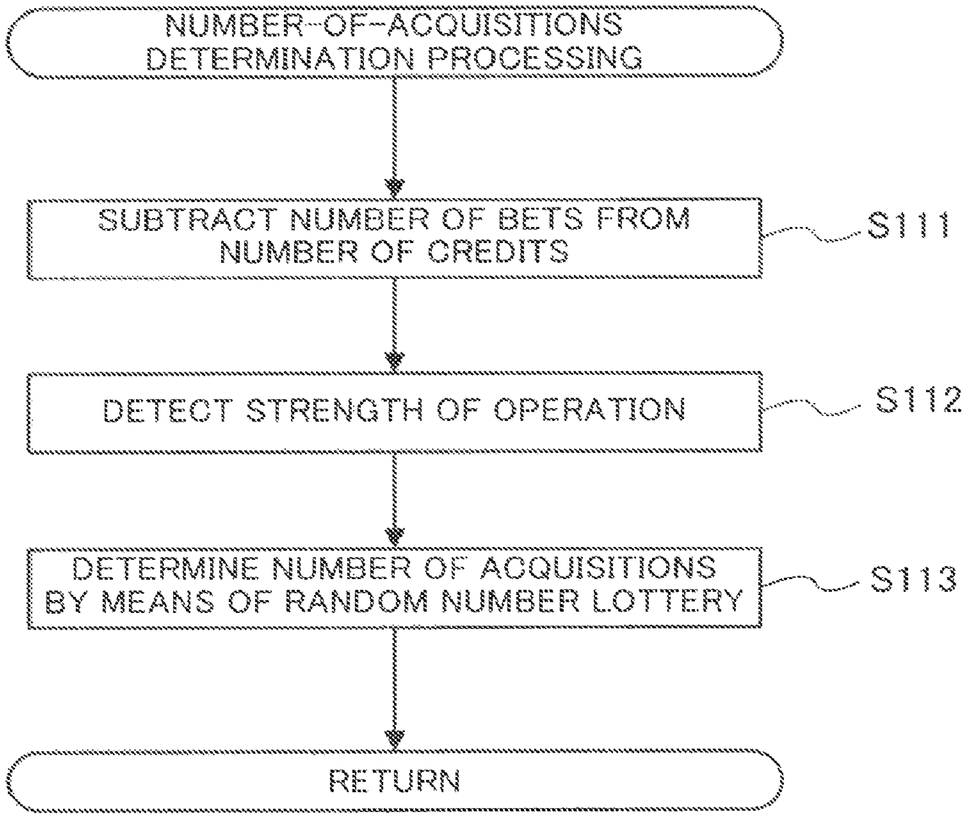
FIG. 12 is a view showing a flowchart of number-of-movements determination processing.

FIG. 12 is a flowchart showing operational procedures for the number-of-acquisitions determination processing (step S24). In FIG. 12, the CPU 21 first subtracts the number of bets from the number of credits that has been input to the game terminal 50*a* (step S111). Specifically, the CPU 21 subtracts the number of bets required for a game executed at this time (for example, 50 credits) from the number of credits having input from the credit input device 66 (FIG. 5) by a player (or the number of credits that is input in advance and stored in the RAM 22). In a case where this subtraction processing has been possible, the CPU 21 enables game execution. That is, the CPU 21 causes the routine to migrate to processing of detecting a strength of an operation (step S112).

Specifically, the CPU 21 detects a strength of a pressing operation of the touch panel 60 or the ROLL button 66. Next, the CPU 21 detects a strength of the pressing in a case where the pressing operation of the touch panel 60 or the ROLL button 66 has been made, and then, stores the detected strength in the RAM 22. The CPU 21 then determines the number of area acquisitions by means of a random number lottery (step S113). In the case of the illustrative embodiment, any one of the rolled and stopped number of dice is adapted to be determined; and therefore, any one of the numbers 1 to 6 is determined.

After the number-of-movements determination processing shown in FIG. 12 has completed, the CPU 21 migrates to the number-of-acquisitions display processing (step S25) shown in FIG. 11 as to the game terminal 50*a*. In the number-of-acquisitions display processing (step S25), the CPU 21, as shown in FIG. 13, first reads out the strength of operation that is detected in the step S112 described above, from the RAM 22, and then, selects a display mode (a dice rolling distance and a rolling time) of dice according to the detected strength from among the distances and times that are stored in advance in the ROM 23 (step S131).

Then, the CPU 21 displays a dice image in a rolling mode on the terminal display device 52*a* of the game terminal 50*a* (step S132). Further, the CPU 21 displays a dice image in a rolling mode so as to move from the terminal display device 52*a* of the game terminal 50*a* to the common display device 12 (step S133). As a result, the terminal display device 52*a* of the game terminal 50*a* and the common display device 12 display a motion image of dice rolling as shown in FIG. 8.

After that, the CPU 21 displays a dice image in a rolling-stop mode on the common display device 12 (step S134). In this manner, as shown in FIG. 9, an image is displayed in such a manner that the dice having rolled from the terminal display device 52*a* of the game terminal 50*a* to the common display device 12 stop on the common display device 12. Thus, the number assigned to faces that is displayed as an image in the dice that has stopped becomes the determined number by means of dice rolling. This number is controlled to be displayed by means of the CPU 71 of the game terminal 50*a*, based on a command from the CPU 21 of the gaming machine 10, so as to be the number of area acquisitions that has been determined in step S113 indicating the number-of-acquisitions determination processing (FIG. 12).

Figure 13:
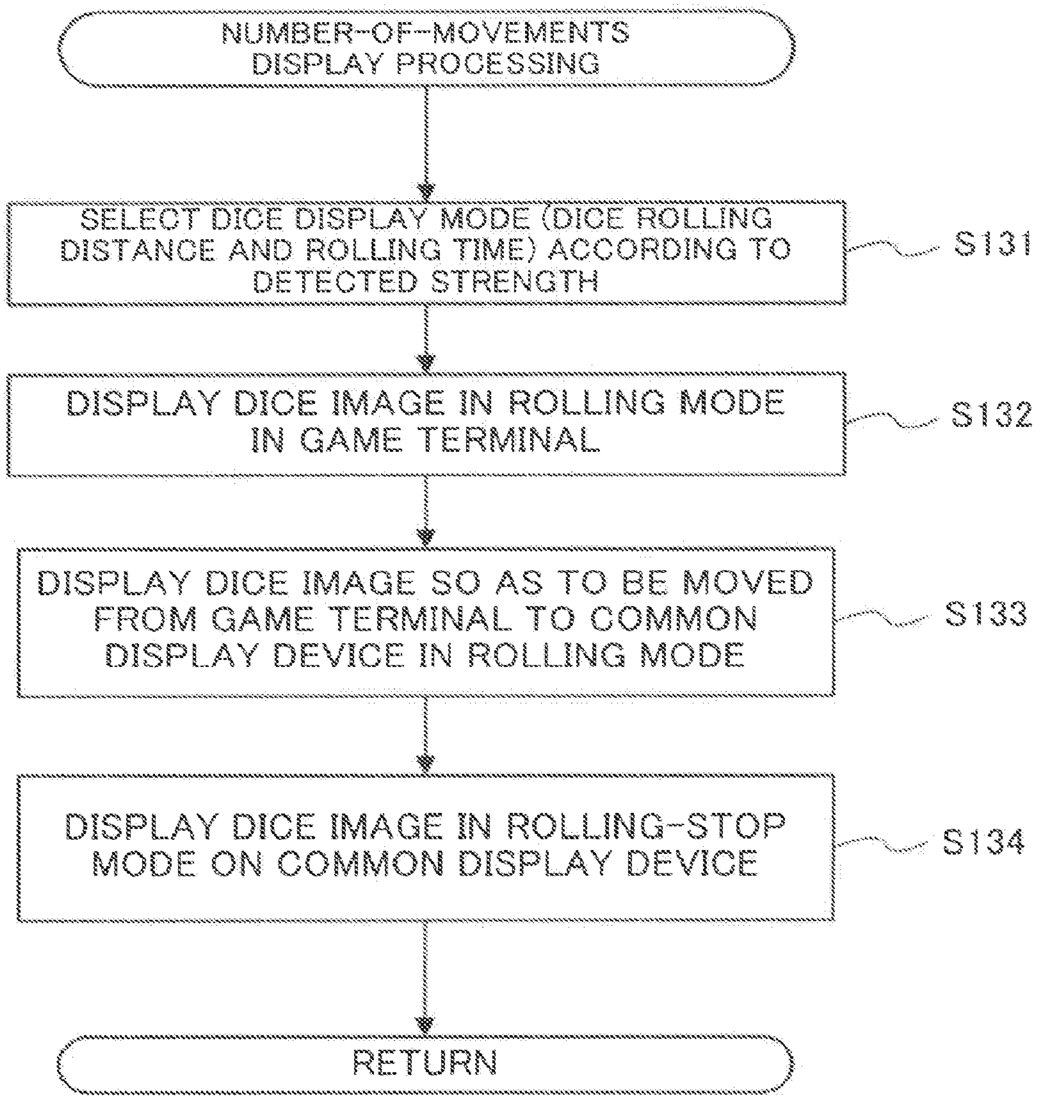
FIG. 13 is a view showing a flowchart of the number-of-movements determination processing.

After the number-of-acquisitions display processing shown in FIG. 13 has completed, the CPU 21 executes object control processing shown in FIG. 11 as to the game terminal 50*a* (step S26). In this processing, the CPU 21 selects areas by the number of acquisitions that has been determined in step S113 indicating the number-of-acquisition determination processing (FIG. 12) and then changes a color of the selected areas.

Figure 14:
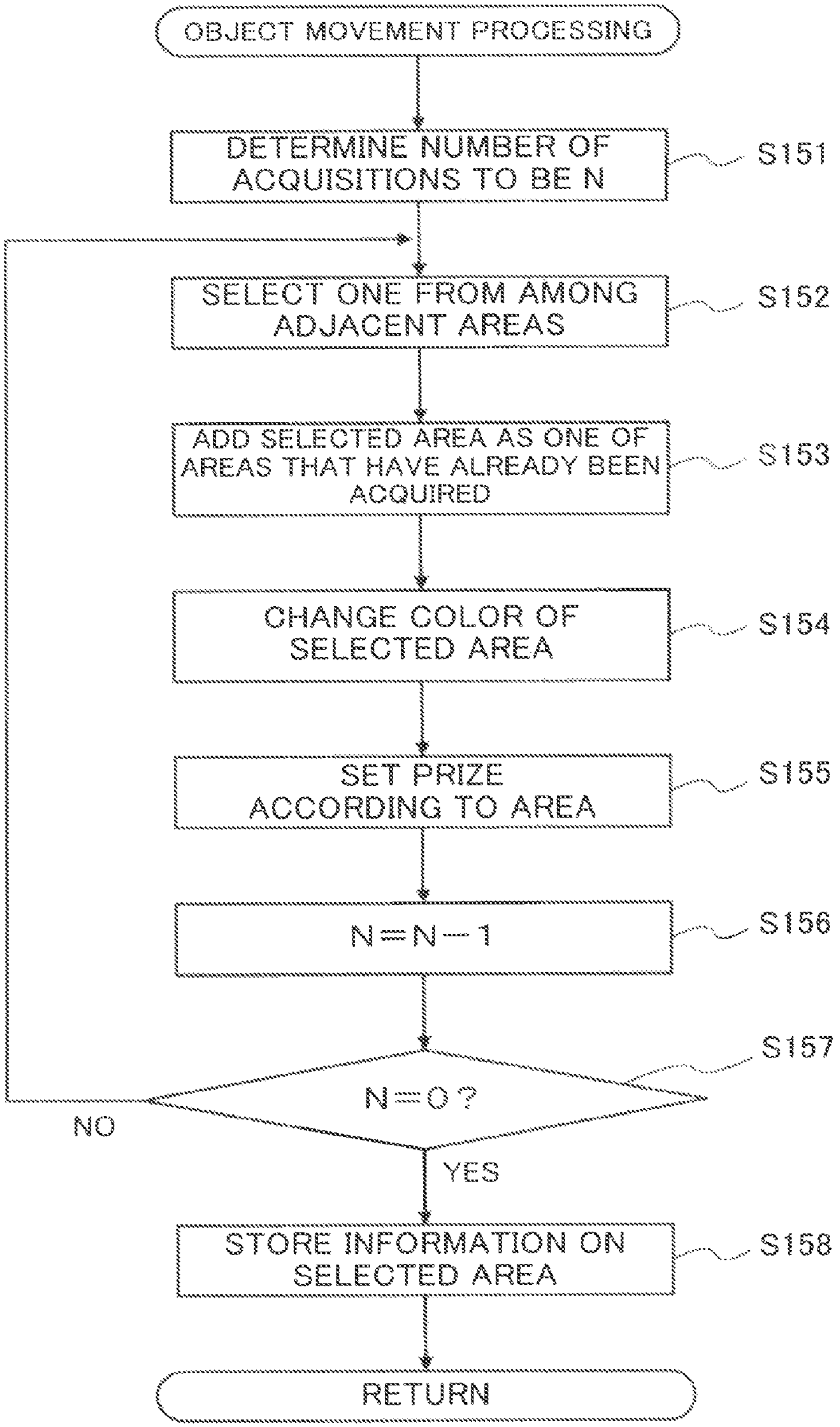
FIG. 14 is a view showing a flowchart of object movement processing.

Specifically, the CPU 21 executes the object control processing shown in FIG. 14. In FIG. 14, the CPU 21 first sets the number of acquisitions that has been determined in the number-of-acquisitions determination processing (FIG. 11: step S24) to N (step S151). Then, one area is randomly selected from the areas that are adjacent to the acquired area at that time (step S152). Subsequently, the CPU 21 adds the area that has been selected in step S152 as one of the areas that have already been acquired, stores the added area in the RAM 22 (step S153), and then, changes the color of the area that has been selected in step S152 to the same color of the acquired areas (step S154). Further, the CPU 21 sets in the RAM 22 the amount of prizes that is stored in advance in the ROM 23 according to the selected area (step S155).

Then, the CPU 21 subtracts 1 from a value of N by performing computation of N=N−1 and then stores a result of the subtraction in the RAM 22 (step S156). Subsequently, the CPU 21 determines whether or not the value of N that is obtained in step S156 described above is set to 0 (step S157). If the value is not set to 0 (step S157: NO), the CPU causes the routine to migrate from step S156 to step S152 and then randomly selects one area from the areas that are adjacent to the area that has been acquired up to now, the areas includes the area selected and added in the step S152.

In this manner, area selection is made until the value of N has been set to 0. That is, the adjacent areas are sequentially selected by the number of acquisitions that has been determined in the number-of-acquisitions determination processing (step S24).

After the areas have been selected by the number of acquisitions that has been determined in the number-of-acquisitions determination processing (step S24) (step S157: YES), the CPU 21 stores information on the selected areas (such as the numbers and positions of the areas, the prizes that are assigned to the areas, or information on military commander cards that are assigned to the areas) in the RAM 22 (step S158). Afterwards, the routine reverts to the game execution processing shown in FIG. 17.

Subsequent to the object control processing as to the game terminal 50*a* (step S26), the CPU 21 stores information representing the completion of a unit game as to one game terminal 50*a* in the RAM 22 (step S27).

Alternatively, in a case where the RAM 22 stores the information representing the completion of the unit game as to the game terminal 50*a* in step S22 (in a case where the unit game of one game terminal 50*a* completes) (step S22: YES), the fact designates that the sequential order of performing a unit game has been turned to the other game terminal 50*b*. Then, in another the game terminal 50*d*, CPU 21 executes: processing of waiting for ROLL (BET) command input (step S33); number-of-acquisitions determination processing (step S34); number-of-acquisitions display processing (step S35), and object control processing (step S36). These processing operations are identical to those in step S23 to step S26 described above except that these processing operations are targeted for the game terminal 50*b*.

Subsequent to the object control processing as to the game terminal 50*b* (step S36), the CPU 21 adds the information representing a completion state of another game terminal 50*b*, which is stored in the RAM 22, to the information representing completion of a unit game as to one game terminal 50*a*. In this manner, in a case where the RAM 22 stores the information representing completion of a unit game as to each of one game terminal 50*a* and the other game terminal 50*b* in an appropriate memory space, the CPU 21 can determine that the unit game has completed as to each of one game terminal 50*a* and the other game terminal 50*b*.

In this manner, in a case where one game terminal 50*a* has not completed a unit game, the CPU 21 executes a unit game as to the game terminal 50*a*, or alternatively, in a case where one game terminal 50*a* has completed a unit game, the CPU 21 executes a unit game as to the other game terminal 50*b*, whereby the unit games can be alternately executed as to the game terminals 50*a* and 50*b*.

Subsequent to unit game completion state storage processing as to the game terminal 50*a* (step S27) or subsequent to unit game completion state storage processing as to the game terminal 50*b* (step S37), the CPU 21 determines whether or not the unit game at each of the game terminals has completed (step S38). Specifically, the CPU 21 checks the unit game completion state that is stored in the RAM 22 and then determines whether or not the unit game has completed as to each of the game terminals 50*a* and 50*b*. In a case where the unit game state is not stored in the RAM 22 as to each of the game terminals 50*a* and 50*b*, the fact designates that the unit game does not complete as to each of the game terminals 50*a* and 50*b*. Then, the CPU 21 causes the routine to migrate to step S22 described above and then continues unit game processing. Alternatively, in a case where the unit game completion state is stored in the RAM 22 as to each of the game terminals 50*a* and 50*b*, the fact designates that the unit game completes as to each of the game terminals 50*a* and 50*b*. Then, the CPU 21 clears the information representing the completion state of the unit game as to the game terminal 50*a* and the information representing the completion state of the unit game as to the game terminal 50*b*, each of which is stored in the RAM 22. The CPU 21 then causes the routine to migrate to step S41.

As described above, the RAM 22 stores the areas that the game terminals 50*a* and 50*b* have acquired in the respective unit games and information relating to the areas (such as prizes assigned to the areas). For example, as shown in FIG. 15, a first terminal storage region A101*a* for sequentially storing unit game results of one game terminal 50*a* (a first game terminal) and a second terminal storage space A101*b* for sequentially storing unit game results of the other game terminal 50*b* (a second game terminal) are provided in a unit game result storage region A101 of the RAM 22. In the first terminal storage region A101*a*, every time the game terminal 50*a* acquires an area, a unit game number, the number and position of the area, a prize that is assigned to the area, and information on a military commander card that is assigned to the area are read out and stored from items of information that are associated to the respective area numbers and that are stored in the ROM 23. In addition, in the second terminal storage space A101*b*, every time the game terminal 50*b* acquires an area, a unit game number, the number and position of the area, a prize that is assigned to the area, and information on a military commander card that is assigned to the area, are read out and stored similarly from the ROM 23.

A unit game number is a number of a game (a unit game) relating to one area acquisition of each player in a case where two players (the game terminals 50*a* and 50*b*) acquire areas alternately. In one unit game, a plurality of areas may be occasionally acquired in accordance with the numbers obtained by rolling dice; and therefore, the plurality of areas may be occasionally stored after associated with the same unit number. For example, as shown in FIG. 15, in the first terminal area A101*a*, in a case where four areas (ar11, ar12, ar13, and ar14) are assigned in association with a unit game number 3, the fact designates that four areas have been acquired in accordance with the fact that the rolled numbers of dice are 4 in a unit game that is specified by the unit game number 3.

The unit game number thus stored in the RAM 22 and information on areas that have been acquired in a unit game specified by the unit game number, are employed to determine whether or not to generate a scramble event (to be described later in the description of step S41).

The CPU 21 reads out from the RAM 22 the prizes that have been determined to be awarded in a unit game (the prizes that are associated with the acquired areas) at a stage at which the unit games as to the game terminals 50*a* and 50*b* respectively complete one time (step S41), and then, the CPU 21 compares the read out prizes with each other.

In a case where the same amount of prize is associated with the acquired areas in the same unit game between the game terminals 50*a* and 50*b* (step S41: YES), the CPU 21 executes scramble event processing (step S42). That is, in a case where the same amounts of prizes are identical in the unit game, a scramble event occurs. This scramble event processing is an event for scrambling the areas that two players (the game terminals 50*a* and 50*b*) have acquired and the prizes that are assigned to the acquired areas in the unit game (adjacent unit game) that compared in the step S41.

Figure 16:
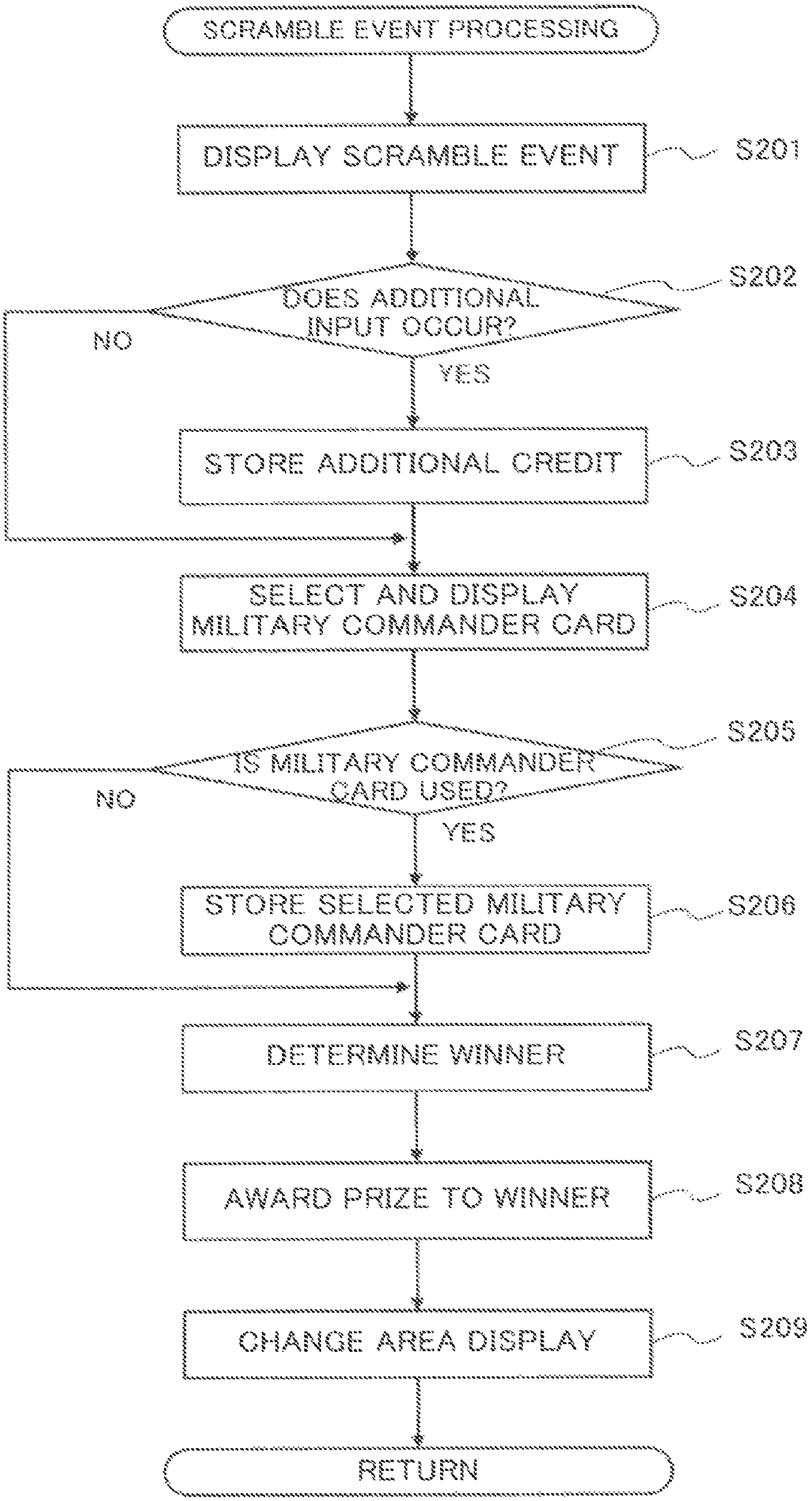
FIG. 16 is a view showing a flowchart of scramble event processing.

FIG. 16 is a flowchart showing details on scramble event processing to be executed in step S42. As shown in FIG. 16, the CPU 21 first provides a display prompting a player to select whether or not to input an additional credit (a scramble event display) when a scramble event has occurred with each of the terminal display devices 52*a* and 52*b* of the game terminals 50*a* and 50*b* and when the scramble event is started (step S201). In a case where an additional credit is input, the number of points for determining a win or loss in the scramble event is improved in accordance with the added amount of the credit.

The CPU 21 determines whether or not an additional credit has been input (step S202). In a case where the additional credit has been input, the number of credits added to the RAM 22 is stored after associated with an game terminal at which such addition occurs (step S203). Subsequent to step S203 or in a case where it is determined that no operational input occurs during a predetermined period of time and no additional credit has been input in step S202 (step S202: NO), the CPU 21 provides a display prompting a player to select whether or not to use military commander cards on a respective one of the terminal display devices 52*a* and 52*b* of the game terminals 50*a* and 50*b* (step S204).

In a scramble event, the number of points according to the number of credits that has been input to each of the game terminals 50*a* and 50*b* and that has increased in accordance with an additional credit, serves as an element for determining a win or loss. In addition, military commander cards used in the scramble event also serves as an element for determining a win or loss. Specifically, the number of points is determined depending on the input number of credits, and at the same time, a result that is obtained by adding the number of points that is assigned to a military commander card used, to the determined number of points, serves as a final number of points for determining a win or loss. For example, in a case where 50 credits have been additionally input in the game terminal 50*a*, if the number of points in the military commander card that is selected in the game terminal 50*a* is 50 points, 100 points that are obtained by adding such additional 50 credits and 50 points of the selected military commander card to each other are counted as the number of points in the scramble event of the game terminal 50*a* (one player). Alternatively, in a case where 30 credits have been additionally input in the game terminal 50*b*, if the number of points of the military commander card selected in the game terminal 50*b* is 100 points, 130 points that are obtained by adding such additional 30 credits and 100 points of the selected military commander card to each other are counted as the number of points in the scramble event of the game terminal 50*b* (the other player).

In step S204 described above, the CPU 21 reads out from the RAM 22 the military commander cards that the respective game terminals 50*a* and 50*b* have acquired up to now (the military cards that are set in the respective acquired areas) and then displays the read out cards in the terminal display devices 52*a* and 52*b* of the respective game terminals 50*a* and 50*b*. The players can select desired military commander cards by operating a touch panel or the operating portions 53*a* and 53*b*.

The CPU 21 determines whether or not an operation of selecting military commander cards has been made (step S205). In a case where such a selecting operation has been made, the CPU 21 determines use of the military commander cards (step S205: YES) and then causes the RAM 22 to store information on the military commander cards that have been respectively selected in the game terminals 50*a* and 50*b* (step S206). In this manner, the RAM 22 stores information required for a scramble event as to the game terminals 50*a* and 50*b*.

Subsequent to step S206 or in a case where no operational input occurs during a predetermined period of time and no military commander card is used in step S205 (step S205: NO), the CPU 21 determines the game terminal 50*a* (one player) or the game terminal 50*b* (the other player) as a winner, based on the number of additional credits or the information on the selected military commander card (step S207). Specifically, the number of points based on the number of additional credits and the selected military commander card (described above) is compared, and a player with more points becomes a winner. The CPU 21 awards to a winning player (game terminal) all of the areas acquired by each of the players in a unit game that has caused a trigger for this scramble event, the loser's military commander card used on the loser side in the scramble event and an area corresponding thereto, and credits added by each of the players in the scramble event (step S208). Specifically, settings of the areas that each of the players has acquired in a unit game, the military commander card used on the loser side in the scramble event, and handling an owner of the area corresponding to the loser's military commander card as a winner are provided in the RAM 22 and a setting of handling the added credits by each of the players in the scramble event as a winner's property is provided. In addition, the CPU 21 changes a color of the area that is transferred from the loser to the winner to the winner's color in the map that is displayed on the common display device 12 (step S209). After that, the CPU 21 causes the routine to revert to the operational procedures shown in FIG. 11.

After the scramble event has completed, the CPU 21 causes the routine to revert to the operational procedures shown in FIG. 11 and then determines whether or not another event such as a free game is associated with the area that is acquired in a unit game (step S43). Specifically, in the RAM 22, events are occasionally stored in the RAM 22 after associated with the respective areas, and the CPU 21 determines whether or not an associated event exists by referring to the RAM 22.

In a case where such an associated event exists (step S43: YES), the CPU 21 reads out a program of the associated event from the ROM 23 and then executes the read out program (step S44). Specifically, the game terminal 50*a* or 50*b*, having acquired the area with which an event is associated, displays a predetermined image on the terminal display device 52*a* or 52*b* in accordance with the event program that has been read out from the ROM 23, and then, advances the event. Subsequent to step S44 or in a case where it is determined that no other event exists in step S43 (step S43: NO), the CPU 21 determines whether or not acquisition of all the areas has completed (step S45). As described above with respect to FIG. 15, the RAM 23 stores information on the areas that have been acquired by two players and then the CPU 21 determines whether or not acquisition of all the areas has completed, based on these items of information (step S45).

In a case where the acquisition of all the areas has not completed (step S45: NO), the CPU 21 causes the routine to migrate to step S22 described above. Alternatively, in a case where acquisition of all the areas has completed (step S45: YES), the CPU 21 completes a normal game.

As has been described above, in the gaming machine 10 of the illustrative embodiment, in a case where two players have acquired the same prize in a unit game played in a normal game (in a case where two players have acquired an area of the same prize), a scramble event for scrambling an area occurs.

In the scramble event, the two players can enhance a winning probability by using the military commander cards that these players have already acquired. That is, the players can be given an impression that the military commander cards were tactics for determining a win or loss in the scramble event.

In addition, in the scramble event, the number of credits that each of the players has additionally input becomes an element for determining a win or loss as well.

Thus, in a normal game to be executed in the gaming machine 10, for example, as in a case in which two players have acquired the same amount of prize in a unit game, in a case where a specific condition has been established, a scramble event occurs, whereby the players are caused to have a tense atmosphere as to when a scramble event occurs, and entertainment of the game can be enhanced.

Further, in the scramble event, a win or loss is not randomly determined, but a result of such a win or loss depends on the player actions such as whether each of the players uses a military commander card or whether or not to input an additional credit. In this manner, the players can be given a sense of satisfaction that they participate in a game.

While the foregoing illustrative embodiment has described a case in which two players always participate in a scramble event, the present invention is not limitative thereto. In a case where one of the two players does not desire to participate, a scramble event may be performed between the other player and the gaming machine 10.

Figure 17:
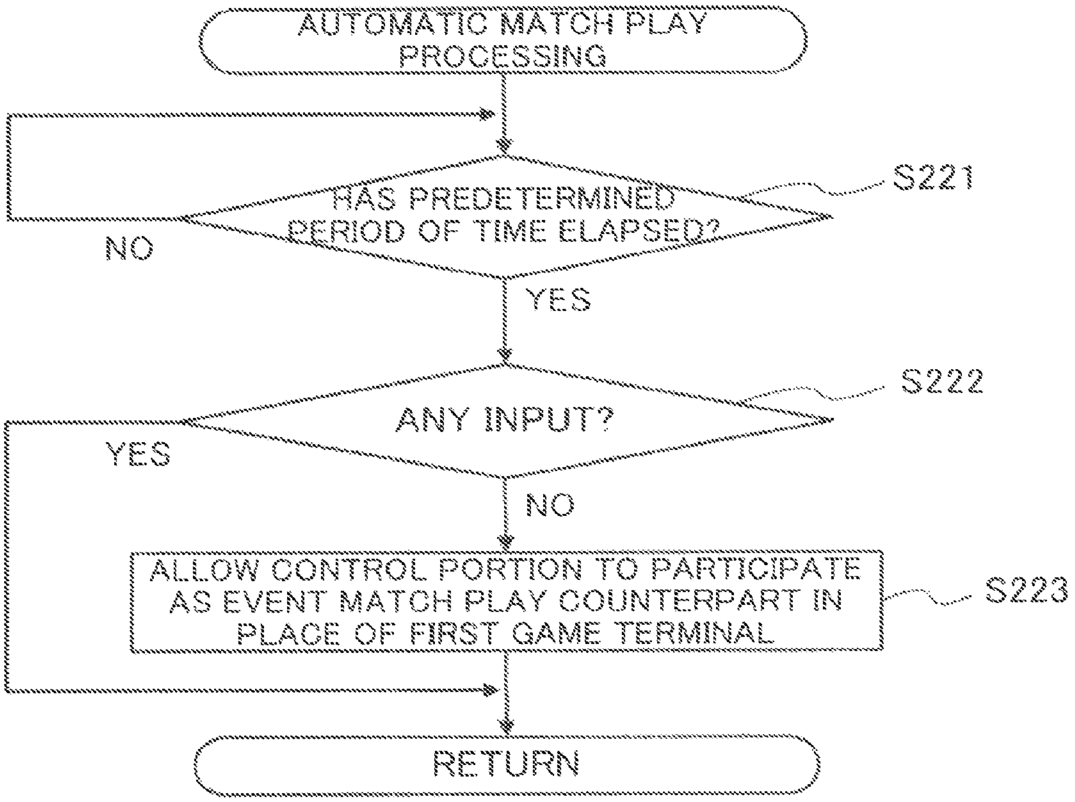
FIG. 17 is a view showing a flowchart of automatic match play processing.

Specifically, in the processing (step S23) of waiting for ROLL (BET) command input shown in FIG. 11, the CPU 21 provides a display prompting a player to input a ROLL (BET) command to the terminal display device 52*a* of the game terminal 50*a* and executes automatic match play processing shown in FIG. 17. In this processing, the CPU 21 provides the display prompting the player to input the ROLL (BET) command to the terminal display device 52*a* of the game terminal 50*a* and then determines whether or not a predetermined period of time has elapsed (step S221). In a case where the predetermined period of time has not elapsed (step S221: NO), the CPU 21 repeats the determination processing until the predetermined period of time has elapsed. In a case where the predetermined period of time has elapsed (step S221: YES), the CPU 21 determines whether or not a player has made an input the ROLL (BET) operation (step S222). In a case where the player has made the input operation (step S222: YES), the fact designates that the player has an intention to participate in a normal game in the game terminal 50*a*. The CPU 21 then causes the routine to migrate to the number-of-acquisitions determination processing (step S24) shown in FIG. 11.

Alternatively, in a case where the player has not made the input operation (step S222: NO), the fact designates that the player does not have the intention to participate in the normal game in the game terminal 50*a* or that no player exists. The CPU 21 then executes the normal game subsequent to the step S24 in FIG. 11 instead of the game terminal 50*a*.

Figure 18:
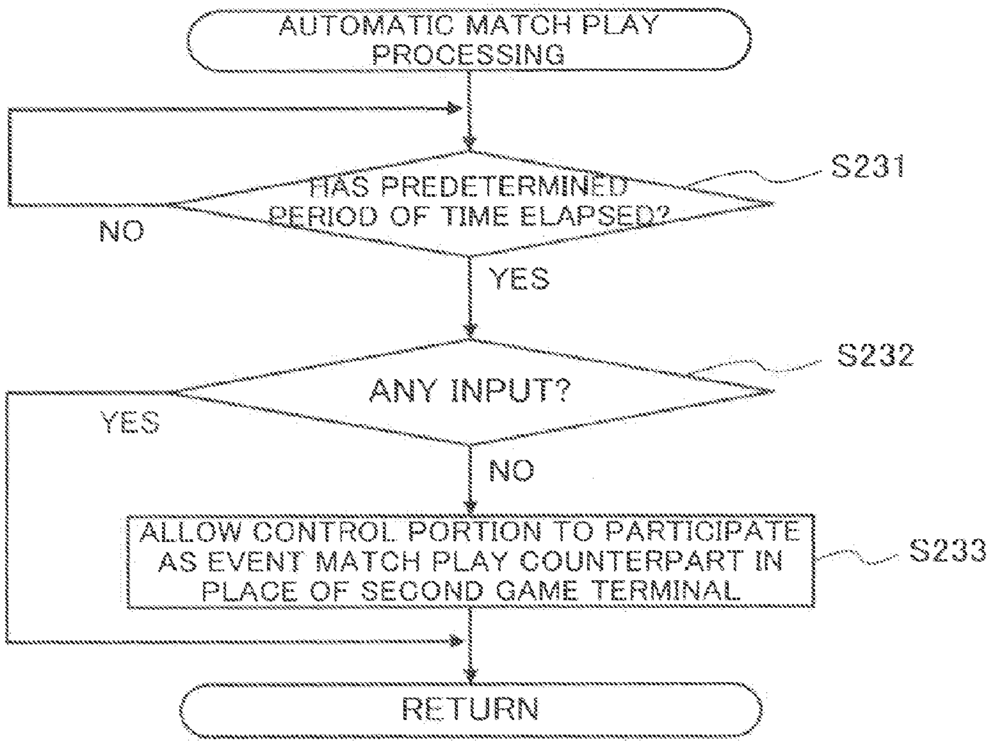
FIG. 18 is a view showing a flowchart of automatic match play processing.

On the other hand, in the processing (step S33) of waiting for ROLL (BET) command input shown in FIG. 11, the CPU 21 provides a display prompting a player to input the ROLL (BET) command to the terminal display device 52*b* of the game terminal 50*b* and executes automatic match play processing shown in FIG. 18. In this processing, the CPU 21 provides the display prompting the player to input the ROLL (BET) command to the terminal display device 52*b* of the game terminal 50*b* and then determines whether or not a predetermined period of time has elapsed (step S231). In a case where the predetermined period of time has not elapsed (step S231: NO), the CPU 21 repeats the determination processing until the predetermined period of time has elapsed. In a case where the predetermined period of time has elapsed (step S231: YES), the CPU 21 determines whether or not a player has input the ROLL (BET) command (step S232). In a case where the player has made the input operation (step S232: YES), in the game terminal 50*b*, the fact designates that the player has an intention to participate in a normal game. The CPU 21 then causes the routine to migrates to the number-of-acquisitions determination processing (step S34) shown in FIG. 11.

Alternatively, in a case where the player has not made the input operation (step S232: NO), the fact designates that the player does not have the intention to participate in the normal game or that no player exists in the game terminal 50*b*. The CPU 21 then executes the normal game subsequent to step S34 in FIG. 11 instead of the game terminal 50*b*.

In this manner, even in a case where one of the players does not participate in a normal game, the CPU 21 executes the normal game instead of the player. Therefore, the normal game can be played even if two players are not ready to play, and even only one player can play the normal game.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

For example, while processing operations such as game control processing, game start processing, game execution processing, and game completion processing have been described as those of the CPU 21 in the gaming machine 10, these processing operations may be executed by the CPU 71 in each of the game terminals 50*a* and 50*b*.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, other configurations requested for performing each step should become apparent from the above descriptions.

What is claimed is:

1. A gaming machine comprising:

at least one input device, at least one processor, at least one display device, and at least one memory device storing a plurality of instructions which, when executed by the at least one processor, cause the at least one processor to operate with the at least one display device and at least one input device to:

a) display a game to a plurality of players, in which a plurality of symbols are continuously arranged on the at least one display device, b) determine which of the arranged plurality of symbols is to be assigned to each of the plurality of players, c) pay out a prize according to each assigned symbol, d) when the prizes paid to at least two of the plurality of players are identical, generate a scramble event in which the assigned symbols are displayed as being scrambled between the plurality of players.

2. The gaming machine according to claim 1, wherein the at least one display device includes a first display device, and a second display device that is disposed upwards of the first display device, and wherein the processor is configured to:

movably display a dice image as rolling from the first display device to the second display device, determine a number that is assigned to any face of the dice as a result of the displayed rolling; and determine a symbol that is assigned to each of the players in accordance with the determined number of the dice.

3. The gaming machine according to claim 1, wherein in the processing operation of generating the scramble event, the processor is configured to determine a result of the scramble event, based on an input element, wherein each player inputs the element according to one or more symbols acquired in past game processing in a scramble event.

4. A control method of a gaming machine, said method comprising:

a) causing at least one processor to execute a plurality of instructions to continuously arrange a plurality of symbols on at least one display device, b) determine which of the arranged symbols is to be assigned to each of a plurality of players, c) pay out a prize according to each assigned symbol, d) when the prizes paid to at least two of the plurality of players are identical, generate a scramble event in which the assigned symbols are displayed as being scrambled between the plurality of players.

* * * * *